| United States Patent [19] | [11] Patent Number: 4,895,919 |
| Faler et al. | [45] Date of Patent: Jan. 23, 1990 |

[54] SPIROBIINDANE COPOLYSILOXANECARBONATES AND METHOD FOR THEIR PREPARATION

[75] Inventors: Gary R. Faler, Scotia; David M. Dardaris, Clifton Park; Donald G. LeGrand, Burnt Hills, all of N.Y.

[73] Assignee: General Electric Company, Schenectady, N.Y.

[21] Appl. No.: 254,742

[22] Filed: Oct. 7, 1988

[51] Int. Cl.$^4$ ............................................. C08G 77/04
[52] U.S. Cl. ........................................ 528/26; 528/21; 528/33
[58] Field of Search ............................. 528/26, 21, 33

[56] References Cited

U.S. PATENT DOCUMENTS

| 3,207,814 | 9/1965 | Goldberg | 528/26 |
| 3,277,055 | 10/1966 | Goldberg | 528/26 |
| 3,679,774 | 7/1972 | LeGrand | 260/824 |
| 3,821,325 | 6/1972 | Merritt, Jr. et al. | 260/824 |
| 3,832,419 | 8/1974 | Merritt, Jr. | 260/824 |
| 4,167,536 | 9/1979 | Factor | 528/26 |

Primary Examiner—Melvyn I. Marquis
Assistant Examiner—Karen A. Hennender
Attorney, Agent, or Firm—William H. Pittman; James C. Davis, Jr.

[57] ABSTRACT

Copolysiloxanecarbonate compositions are prepared by the reaction of a carbonate precursor such as phosgene with a mixture of bisphenols including a spirobiindane bisphenol, at least one of said bisphenols containing polydiorganosiloxane moieties. The reaction may take place in one step or sequentially. The products are characterized by low processing temperature, low orientational birefringence and high ductility.

20 Claims, No Drawings

SPIROBIINDANE COPOLYSILOXANECARBONATES AND METHOD FOR THEIR PREPARATION

This invention relates to copolycarbonates and their preparation, and more particularly to copolycarbonates having low orientational birefringence and favorable processing properties.

Polycarbonates, being transparent, are in wide use for the manufacture of optical disks. For the most part, use of such disks has hitherto been limited to applications in which recording of data in permanent form is acceptable, such as for sound recording and ROM memory for computers. It is of increasing interest to develop optical disks which may be erased and on which new data may be recorded.

Data on optical disks are read by a plane polarized laser beam, associated with a similar reference beam polarized in a perpendicular direction. For accurate reading, it is necessary to minimize phase retardation of these laser beams upon passage through the disk. One factor directly affecting retardation is birefringence; i.e., the difference between indices of refraction of light polarized in two directions perpendicular to each other.

Birefringence has several components, caused by such factors as molecular structure and degree of molecular orientation. "Orientational" birefringence of a polymer, ideally measured after perfect orientation of all polymer molecules by stretching, is a function solely of molecular structure. Approximate measurements of orientational birefringences of several polymers, for the purpose of comparison, may be made on samples which have been injection molded under substantially identical conditions.

In copending, commonly owned application Ser. No. 40,528, filed Apr. 20, 1987, there are disclosed copolycarbonates of bisphenol A and various spirobiindane bisphenols, particularly 6,6'-dihydroxy-3,3,3',3'-tetramethyl-1,1'-spiro(bis)indane (hereinafter "SBI"). Many of such copolycarbonates, particularly those containing SBI structural units, have very low orientational birefringences. Therefore, their potential for use in optical disk manufacture is high.

However, copolycarbonates of bisphenol A and spirobiindane bisphenols also have certain disadvantageous properties, particularly at high levels of spirobiindane structural units. Among these are lack of ductility, high processing temperature and a tendency toward stress cracking. The first two of these are evidenced respectively by low tensile elongation and high glass transition temperature (Tg). The high processing temperature of spirobiindane copolycarbonates is particularly disadvantageous for optical disk manufacture, since it makes it difficult to mold such disks on commercially available molding equipment. Other properties are also of interest for polycarbonates of this type, including low flammability as illustrated by a V-0 rating under Underwriters Laboratories test procedure UL-94.

The present invention provides a class of copolycarbonates of spirobiindane bisphenols which is characterized by transparency, high ductility, low processing temperature, low stress cracking tendency, relative ease of manufacture and, in addition, low orientational birefringence. Various species of such copolycarbonates also have other advantageous properties such as low flammability. There is also provided a relatively simple method for preparing such copolycarbonates.

In one of its aspects, therefore, the invention is directed to copolysiloxanecarbonate compositions comprising structural units of the formulas

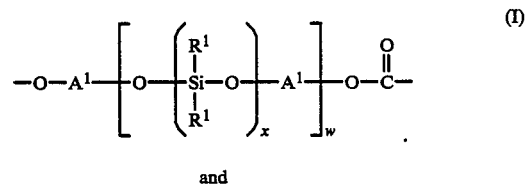

and

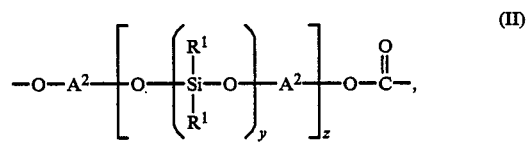

wherein:
$A^1$ is

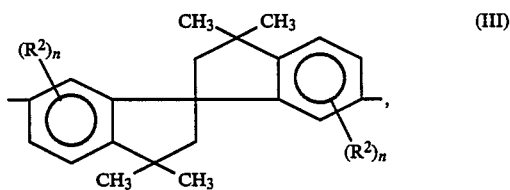

$A^2$ is

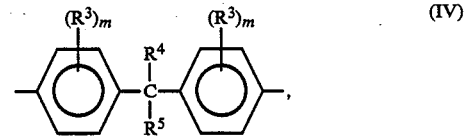

$R^1$ is a hydrocarbon radical, each of $R^2$ and $R^3$ is independently $C_{1-4}$ alkyl or halo, each of $R^4$ and $R^5$ is independently $C_{1-4}$ alkyl or phenyl, m is 0–4, n is 0–3, each of x and y has an average value of about 0–200 and the average value of $x+y$ is at least about 5, w is 0 when x is 0 and at least 1 when x is greater than 0, and z is 0 when y is 0 and at least 1 when y is greater than 0; at least one of w and z being 1 or greater.

A crucial aspect of the present invention is the presence in the copolysiloxanecarbonate compositions of structural units of formula I, containing spirobiindane moieties of formula III. Said moieties may be derived from SBI or various alkyl- or halo-substituted analogs thereof, especially those in which n is 1 or 2 and $R^2$ is methyl, chloro or bromo. The preferred compound is SBI, in which n is 0.

Also present in the copolysiloxanecarbonate compositions of the invention are structural units of formula II, derived from bisphenols having a radical of formula IV attached to two hydroxy groups. They include aromatically unsubstituted and substituted bisphenols, according as m is 0 or a positive number. The value of m is most often 0 or 2 and preferably 0. When present, the $R^3$ radicals are usually methyl or bromo.

The $R^4$ and $R^5$ values may be $C_{1-4}$ alkyl or phenyl radicals. Preferably, $R^4$ and $R^5$ are both methyl. Thus, the preferred units of formula I are those derived from bisphenol A, or 2,2-(4-hydroxyphenyl)propane.

The structural units of at least one of formulas I and II further contain diorganosiloxane units, the total number of which is represented by the values of x and y. At least about 5 and preferably at least about 10 of said moieties are present in each structural unit which contains them.

The values of w and z are each 0 if no corresponding diorganosiloxane units are present, and at least one if such moieties are present. They are most often no greater than 1, but may be greater in a minor proportion of the polycarbonate units as the result of condensation reactions which may take place during the preparation of the precursor compounds. In the diorganosiloxane units $R^1$ may be an aliphatic, alicyclic or aromatic hydrocarbon radical. It is most often a $C_{1-4}$ alkyl radical, preferably methyl.

Also optionally present in the structural units of formula II are the aforementioned diorganosiloxane units. However, the invention requires the presence of such moieties in the units of at least one of formulas I and II.

Another aspect of the invention is a method for preparing the above-described copolysiloxanecarbonate compositions, said method comprising effecting reaction between:
(A) a carbonate precursor,
(B) at least one spirobiindanol compound of the formula

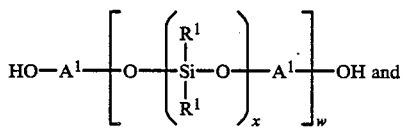

(C) at least one dihydroxyaromatic compound of the formula

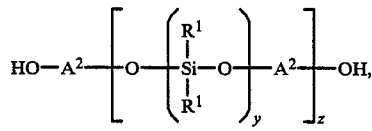

wherein $A^{1-2}$, $R^1$, w, x, y and z are as previously defined.

Reagent A in the method of this invention is a carbonate precursor. Illustrative compounds of this type are phosgene and diaryl carbonates, especially diphenyl carbonate. Phosgene is generally preferred.

Reagent B is a spirobiindanol compound which may be a spirobiindane bisphenol such as SBI or a spirobiindanol-terminated polydiorganosiloxane. The latter may be prepared by the reaction of an α,ω-dichloropolydiorganosiloxane with a spirobiindane bisphenol in the presence of an acid acceptor, typically an amine and preferably a tertiary amine such as triethylamine. Spirobiindanolterminated polydiorganosiloxanes are disclosed and claimed in copending, commonly owned application Ser. No. 267,860, filed Nov. 7, 1988.

Their preparation is illustrated by the following example. The proportion of diorganosiloxane units, whenever specified herein, was determined by Si-29 nuclear magnetic resonance spectroscopy.

EXAMPLE 1

To a mixture of 200 ml. of methylene chloride, 12.61 grams (40.9 mmol.) of anhydrous SBI and 11.5 ml. (81.8 mmol.) of triethylamine was added dropwise over 10 minutes, with stirring, 49.66 grams (20.5 mmol.) of an α,ω-dichloropolydimethylsiloxane having an average of 32 dimethylsiloxane units. The mixture was heated under reflux for 20 minutes, cooled and acidified with aqueous hydrochloric acid solution. The organic phase was separated, washed three times with water and dried over magnesium sulfate. Upon vacuum evaporation of the methylene chloride, the desired spirobiindanol-terminated polydimethylsiloxane was obtained as a clear liquid.

Reagent C is a bisphenol or a bisphenol-derived compound containing diorganosiloxane units. The latter compounds may be prepared by the reaction of a bisphenol with an α,ω-dichloropolydiorganosiloxane, using known methods as disclosed, for example, in U.S. Pat. No. 3,821,325.

When reagent A is phosgene, the preparation of the copolysiloxanecarbonate is typically conducted in an alkaline medium and in the presence of a tertiary amine catalyst such as triethylamine, paralleling known phosgenation reactions for the preparation of polycarbonates. Various options are available for this reaction, one of which is simple one-step phosgenation of a mixture of reagents B and C.

However, it is usually preferred to conduct the reaction sequentially. Most often, at least one of reagents B and C wherein w and z are 0 is initially phosgenated in an alkaline medium, to form a bischloroformate composition comprising monomeric bischloroformates and oligomeric carbonate bischloroformates. There is then added a further portion of at least one of reagents B and C in which w and z are 1, and the mixture is further phosgenated to produce the copolysiloxanecarbonate. There may also be present one or more conventional endcapping agents such as phenol, p-t-butylphenol or p-cumylphenol.

The sequential process is usually conducted at temperatures in the range of about 20°-50° C. and under interfacial conditions involving water and a substantially water-immiscible organic solvent, typically methylene chloride. Alkaline reaction conditions are employed, normally involving a pH in the range of about 8-12. The copolysiloxanecarbonate is then obtained as a solution in the organic liquid and may be conventionally recovered therefrom.

Copolysiloxanecarbonates having a wide spectrum of properties may be obtained by varying the identities and proportions of reagents B and C. Within experimental error, the number proportions of units of formulas I and II in the copolysiloxanecarbonates of the invention will correspond to the molar proportions of reagents B and C, respectively. Products containing about 65-80% and especially about 70-75% (by number) of units of formula I are often preferred, by reason of their low orientational birefringences.

Proportions of diorganosiloxane units are expressed in terms of the number ratio of such units to bisphenol moieties (that is, $A^1$ or $A^2$ moieties) in the copolysiloxanecarbonate and in the mixture of reagents B and C. (It will be apparent that a polydiorganosiloxane bisphenol—i.e., reagent B or C in which the value of w and/or z is 1—contains two bisphenol moieties.) They may be readily calculated from the stoichiometry of the reaction by multiplying the number of moles of polydiorganosiloxane bisphenol by the average number of diorganosiloxane units per molecule, and dividing the product by the sum of (a) the number of moles of reagents B and C in which w and z are 0 and (b) twice the number of moles of said reagents in which w and z are 1. Said ratio may be, for example, in the range of about 0.1–4.0:1 and is preferably about 0.8–1.2:1.

The identities of reagents B and C employed will also depend to some extent on the proportions of units of formulas I and II desired in the copolysiloxanecarbonate product. When relatively small proportions of units of formula I and of diorganosiloxane units are desired, the polysiloxane reagent may be reagent C. On the other hand, high proportions of units of formula I coupled with high proportions of diorganosiloxane units require the employment of a polydiorganosiloxane compound, such as the product of Example 1, as reagent B.

The preparation of the copolysiloxanecarbonates of this invention is illustrated by the following examples. All molecular weights are weight average and were determined by gel permeation chromatography relative to polystyrene. Proportions of structural units and moieties were calculated from the stoichiometry.

EXAMPLE 2

A mixture of 80 ml. of methylene chloride, 60 ml. of water and 13.1 grams (42.5 mmol.) of anhydrous SBI was adjusted to a pH of 9.5 by the addition of 50% aqueous sodium hydroxide solution. Phosgene was passed into the mixture for 10 minutes at 0.83 gram per minute, to a total of 84 mmol. An additional 5.77 grams (18.7 mmol.) of SBI was added and phosgene passage was continued for 4.4 minutes (36.9 mmol.), with maintenance of the pH at 9.5 for the entire phosgenation period.

The reaction mixture, comprising SBI bischloroformate and carbonate oligomers thereof, was purged with nitrogen and there were added 4.75 grams (20.8 mmol.) of bisphenol A and 7.08 ml. (1.5 mmol.) of a bisphenol A-capped polydimethylsiloxane containing an average of 10 dimethylsiloxane units per molecule, the latter being added as a solution containing 1 gram of the capped polydimethylsiloxane in 4 ml. of methylene chloride. Simultaneously, there were added 1 ml. each of a 0.83 M solution of triethylamine in methylene chloride and a 0.83 M solution of phenol in methylene chloride. The mixture was stirred for 5 minutes with the pH being maintained in the range of 9–11, after which an additional 47 mmol. of phosgene was added. The product was diluted with methylene chloride, washed three times with aqueous hydrochloric acid solution and then with water until no chloride could be detected in the wash water. The copolysiloxanecarbonate was precipitated by pouring the solution into an excess of a methanol-isopropanol mixture, filtered and dried.

The product was a copolysiloxanecarbonate having a molecular weight of 76,000, containing 73% of units of formula I and having a ratio of dimethylsiloxane units to bisphenol moieties of 0.18:1. A thin film of the copolysiloxanecarbonate, cast from a solution in methylene chloride, was clear. Its intrinsic birefringence was 0.0014, identical to that of an SBI-bisphenol A copolycarbonate of corresponding proportions.

EXAMPLES 3–4

Following the procedure of Example 2, similar copolysiloxanecarbonates were prepared in which the ratios of dimethylsiloxane units to bisphenol moieties were 0.43 and 0.82:1, respectively.

EXAMPLE 5

A mixture of 10.4 grams (33.9 mmol.) of SBI, 3.3 grams (14.5 mmol.) of bisphenol A, 1 ml. of a 0.25 M solution of p-cumylphenol in methylene chloride, 100 ml. of methylene chloride and 75 ml. of water was adjusted to a pH in the range of 9–10 by the addition of 50% aqueous sodium hydroxide solution. Phosgene was introduced at 0.495 gram per minute for 20 minutes (total 100 mmol.), while the pH was maintained in the same range. There were then added 4.78 grams (1.61 mmol.) of the product of Example 1 and 2 ml. of a 0.25 M solution of triethylamine in methylene chloride, and the mixture was stirred for 5 minutes in the same pH range. An additional charge of 2.48 grams (25 mmol.) of phosgene was added over 5 minutes, after which the solution was purged with nitrogen and diluted with methylene chloride.

The organic phase was separated and washed with dilute aqueous hydrochloric acid and water, and the copolysiloxanecarbonate was precipitated by pouring into methanol, filtered and dried in a vacuum oven. It had a molecular weight of 114,100, contained 71% of units of formula I and had a ratio of dimethylsiloxane units to bisphenol moieties of 1:1.

EXAMPLE 6

Following the procedure of Example 5, a copolysiloxanecarbonate was prepared from 2.89 moles of SBI, 1.56 moles of bisphenol A, 25 mmol. of p-cumylphenol and 556 mmol. of a spirobiindanol-terminated polydimethylsiloxane similar to that of Example 1 but containing an average of 32 dimethylsiloxane units per molecule. It had a molecular weight of about 143,000, contained 69% of units of formula I and had a ratio of dimethylsiloxane units to bisphenol moieties of 1:1.

As previously mentioned, the copolysiloxanecarbonates of this invention are characterized by such properties as high ductility, low processing temperature and low orientational birefringence. High ductility is demonstrated by high tensile elongation, and low processing temperature by a relatively low glass transition temperature ($T_g$), when compared with a corresponding SBI-bisphenol A copolycarbonate containing no diorganosiloxane units. In addition, the product of Example 5 has a V-0 flame retardancy rating.

In the following table, various properties of the copolysiloxanecarbonates of this invention, after extrusion and pelletization, are listed. The molecular weights of the products of Examples 5 and 6 are lower than those given in the examples hereinabove because of degradation during the extrusion-pelletization process. The control was a copolycarbonate free from diorganosiloxane units and consisting of 71% SBI carbonate and 29% bisphenol A carbonate units. Intrinsic viscosities were determined in methylene chloride at 25° C.

|  | Example | | | | |
| --- | --- | --- | --- | --- | --- |
|  | 2 | 3 | 5 | 6 | Control |
| Mw | 76,000 | — | 94,000 | 122,000 | 118,000 |
| Intrinsic viscosity, |  |  | 0.54 | 0.65 | 0.72 |

-continued

| | Example | | | | Control |
|---|---|---|---|---|---|
| | 2 | 3 | 5 | 6 | |
| dl./g | | | | | |
| Tg, °C. | 200 | 188 | 164 | 204 | 210 |
| Orientational birefringence × $10^3$ | 1.4 | — | 0.08 | 0.6 | 1.4 |
| Tensile strength, MPa.: | | | | | |
| At yield | — | — | 43.8 | 49.4 | — |
| At break | — | — | 30.1 | 46.8 | 70.2 |
| Tensile elongation, % | — | — | 55 | 15 | 0 |

In addition to the foregoing properties, the copolysiloxanecarbonates of this invention can be molded into articles which do not undergo the stress cracking characteristic of ordinary SBI bisphenol A copolycarbonates.

What is claimed is:

1. A copolysiloxanecarbonate composition comprising structural units of the formulas $$-O-A^1-\left[O-\left(\underset{R^1}{\overset{R^1}{Si}}-O\right)_x-A^1\right]_w-O-\overset{O}{\underset{}{C}}- \quad (I)$$

and $$-O-A^2-\left[O-\left(\underset{R^1}{\overset{R^1}{Si}}-O\right)_y-A^2\right]_z-O-\overset{O}{\underset{}{C}}-, \quad (II)$$

wherein:

$A^1$ is

<chemical structure (III): spirobiindane with (R²)ₙ substituents and CH₃ groups>

$A^2$ is

<chemical structure (IV): diphenyl with (R³)ₘ substituents and central C with R⁴, R⁵>

$R^1$ is a hydrocarbon radical, each of $R^2$ and $R^3$ is independently $C_{1-4}$ alkyl or halo, each of $R^4$ and $R^5$ is independently $C_{1-4}$ alkyl or phenyl, m is 0–4, n is 0–3, each of x and y has an average value of about 0–200 and the average value of x+y is at least about 5, w is 0 when x is 0 and at least 1 when x is greater than 0, and z is 0 when y is 0 and at least 1 when y is greater than 0; at least one of w and z being 1.

2. A composition according to claim 1 wherein n is 0.

3. A composition according to claim 2 wherein each of $R^4$ and $R^5$ is methyl and m is 0.

4. A composition according to claim 3 wherein $R^1$ is methyl.

5. A composition according to claim 4 which contains about 65–80% by number of units of formula I.

6. A composition according to claim 5 wherein the number ratio of diorganosiloxane units to $A^1$ and $A^2$ moieties is in the range of about 0.1–4.0:1.

7. A composition according to claim 6 which contains about 70–75% by number of units of formula I, and wherein the number ratio of diorganosiloxane units to $A^1$ and $A^2$ moieties is in the range of about 0.8–1.2:1.

8. A method for preparing a copolysiloxanecarbonate composition which comprises effecting reaction between:

(A) a carbonate precursor,
(B) at least one spirobiindanol compound of the formula $$HO-A^1-\left[O-\left(\underset{R^1}{\overset{R^1}{Si}}-O\right)_x-A^1\right]_w-OH \text{ and}$$

(C) at least one dihydroxyaromatic compound of the formula $$HO-A^2-\left[O-\left(\underset{R^1}{\overset{R^1}{Si}}-O\right)_y-A^2\right]_z-OH,$$

wherein:

$A^1$ is

<chemical structure (III): spirobiindane with (R²)ₙ and CH₃ groups>

$A^2$ is

<chemical structure (IV): diphenyl with (R³)ₘ substituents and central C with R⁴, R⁵>

$R^1$ is a hydrocarbon or halohydrocarbon radical, each of $R^2$ and $R^3$ is independently $C_{1-4}$ alkyl or halo, each of $R^4$ and $R^5$ is independently $C_{1-4}$ alkyl or phenyl, m is 0–4, n is 0–3, each of x and y has an average value of about 0–200 and the average value of x+y is at least about 5, w is 0 when x is 0 and at least 1 when x is greater than 0, and z is 0 when y is 0 and at least 1 when y is greater than 0; at least one of w and z being 1.

9. A method according to claim 8 wherein reagent A is phosgene.

10. A method according to claim 9 wherein n is 0.

11. A method according to claim 10 wherein the reaction is effected under interfacial conditions in water and a substantially water-immiscible organic solvent.

12. A method according to claim 11 wherein the organic solvent is methylene chloride.

13. A method according to claim 12 wherein each of $R^4$ and $R^5$ is methyl and m is 0.

14. A method according to claim 13 wherein $R^1$ is methyl.

15. A method according to claim 14 wherein w is 0 and z is 1.

16. A method according to claim 14 wherein w is 1 and z is 0.

17. A method according to claim 14 wherein the reaction is conducted sequentially by initially converting at least one of reagents B and C to a bischloroformate composition, adding a further portion of at least one of reagents B and C and phosgenating.

18. A method according to claim 17 wherein reagent B is present in the amount of about 65–80 mole percent, based on the total of reagents B and C.

19. A method according to claim 18 wherein the number ratio of diorganosiloxane units to $A^1$ and $A^2$ moieties in reagents B and C taken together is in the range of about 0.1–4.0:1.

20. A method according to claim 19 wherein reagent B is present in the amount of about 70–75 mole percent, based on the total of reagents B and C, and the number ratio of diorganosiloxane units to $A^1$ and $A^2$ moieties in reagents B and C taken together is in the range of about 0.8–1.2:1.

* * * * *